United States Patent
Dow et al.

(10) Patent No.: US 6,232,973 B1
(45) Date of Patent: *May 15, 2001

(54) APPLIANCE AND METHOD FOR NAVIGATING AMONG MULTIPLE CAPTURED IMAGES AND FUNCTIONAL MENUS

(75) Inventors: James C. Dow, Fort Collins; Dan L. Dalton, Greeley; Michael L. Rudd, Fort Collins; Karin C. Ruffatto, Fort Collins; Barry K. Hansen, Fort Collins; Thomas E. Berg, Fort Collins; David J. Sims, Fort Collins, all of CO (US); Daniel Formosa, Montvale, NJ (US); Sandra Nieves; Paul Hamburger, both of New York, NY (US); Michael J. DeVries, Loveland; Nancy Shepard, Arvada, both of CO (US); Scott Henderson, Brooklyn, NY (US); Davin Stowell; Steven Vordenberg, both of New York, NY (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,584

(22) Filed: Aug. 7, 1998

(51) Int. Cl.[7] ................................. G06F 3/14; H04N 1/00
(52) U.S. Cl. ......................... 345/352; 345/970; 382/313; 358/473
(58) Field of Search ...................................... 345/358, 970, 345/352, 353, 354, 356, 146, 156; 358/468, 471, 473, 472, 474, 478, 479, 448, 443, 312, 313, 317; 382/313

(56) References Cited

U.S. PATENT DOCUMENTS 4,061,380 * 12/1977 Carnahan et al. .................... 340/146
4,260,979 * 4/1981 Smith .................................... 340/146

(List continued on next page.)

OTHER PUBLICATIONS

Mike Morgan, "Developing for Netscape One", Que, p. 85, Jan. 1997.*
Robert Cowart, "Mastering Windows 3.1 Special Edition", Sybex, 1993.*

Primary Examiner—Raymond J. Bayerl
Assistant Examiner—Thomas J. Joseph (57) ABSTRACT

A capturing and viewing appliance and method are used for capturing and communicating images. The capturing and viewing appliance is an instrument used to capture and communicate images to other devices with communication capabilities. The capturing and viewing appliance includes a processor for manipulating and viewing the images on a built-in display. Program code stored in internal memory includes a menu/image navigation application program which allows the user to use navigation buttons to view multiple images as well as navigate menus. According to another aspect of the invention, the menu/image navigation interface provides a user-friendly interface for effective communication of functionality of an appliance or other device to the user through use of animated transitions. Through the use of icons, menus, navigation buttons and animated transitions used to communicate functionality to the user, the present invention presents a novel user interface which makes the menu/image navigation user interface and method a solution in devices with limited resources which need to be able to navigate among multiple images arranged in different orientations. The menu/image navigation appliance and method is designed for navigating among multiple captured images and operating the appliance using menus through instrument reuse which is especially useful in portable hand-held appliances or other devices which are capable of displaying images where space and compactness are a concern.

20 Claims, 10 Drawing Sheets

U.S. PATENT DOCUMENTS

| | | | |
|---|---|---|---|
| 5,123,064 | * | 6/1992 | Hacker et al. ........................ 340/146 |
| 5,261,013 | * | 11/1993 | Murata ................................. 358/471 |
| 5,595,445 | * | 1/1997 | Bobry .................................. 358/473 |
| 5,673,401 | * | 9/1997 | Volk et al. ............................ 345/327 |
| 5,682,511 | * | 10/1997 | Sposato et al. ....................... 345/353 |
| 5,748,339 | * | 5/1998 | Suzuki et al. ........................ 358/298 |
| 5,774,233 | * | 6/1998 | Sakamoto ............................. 358/451 |
| 5,819,032 | * | 10/1998 | Vries .................................... 345/348 |
| 5,844,693 | * | 12/1998 | Miyata ................................. 358/452 |
| 5,892,523 | * | 4/1999 | Tanaka et al. ............................ 347/3 |
| 5,898,436 | * | 4/1999 | Stewart et al. ....................... 345/354 |
| 5,905,497 | * | 5/1999 | Vaughan ............................... 345/352 |
| 6,005,681 | * | 12/1999 | Pollard et al. ....................... 358/473 |
| 6,072,600 | * | 6/2000 | Wertsberger ......................... 358/479 |

* cited by examiner

APPLIANCE AND METHOD FOR NAVIGATING AMONG MULTIPLE CAPTURED IMAGES AND FUNCTIONAL MENUS

CROSS REFERENCE TO RELATED APPLICATIONS

This application Ser. No. 09/130,869 is related to U.S. application entitled "APPLIANCE AND METHOD OF USING SAME HAVING A SEND CAPABILITY FOR STORED DATA", U.S. application Ser. No. 09/130,080 entitled "APPLIANCE AND METHOD OF USING SAME HAVING A USER HELP CAPABILITY", U.S. application Ser. No. 09/130,573 entitled "APPLIANCE AND METHOD OF USING SAME FOR CAPTURING IMAGES", U.S. application Ser. No. 09/130,082 entitled "APPLIANCE AND METHOD OF USING SAME HAVING A DELETE CAPABILITY FOR SAVED DATA", U.S. application Ser. No. 09/130,789 entitled "APPLIANCE AND METHOD OF USING SAME HAVING A CAPABILITY TO GRAPHICALLY ASSOCIATE AND DISASSOCIATE DATA WITH AND FROM ONE ANOTHER", U.S. application Ser. No. 09/130,081 entitled "APPLICATION AND METHOD FOR COMMUNICATING AND VIEWING MULTIPLE CAPTURED IMAGES", U.S. application Ser. No. 09/130,572 entitled "APPLIANCE AND METHOD FOR CAPTURING IMAGES HAVING A USER ERROR INTERFACE", U.S. application Ser. No. 09/131,258 entitled "APPLIANCE AND METHOD FOR VIEWING CAPTURED IMAGES", and U.S. application Ser. No. 09/130,868 entitled "APPLIANCE AND METHOD FOR MENU NAVIGATION", which are filed contemporaneously herewith and are incorporated herein by reference.

BACKGROUND OF THE INVENTION

1. Field of the Invention

The present invention generally relates to the field of digital capturing and, more particularly, relates to a user interface for a portable hand-held capturing appliance for capturing and manipulating images through digital scanning or other means of capturing and communicating those images to other devices.

2. Related Art

Intangible information is a vital business asset that can be exploited for competitive advantage if managed properly. In the past fifteen years, improvements in information processing have been achieved primarily from the widespread use of microcomputers in the workplace and their application in local and wide area networks. Through such applications as electronic mail (email) and networked access to document storage servers, the electronic communications market has exploded. Nevertheless, business is still far from reaching a "paperless" workplace. For example, according to a 1993 report by BIS Strategic Decisions (hereinafter BIS), an information technology consulting firm, more than 90 billion documents were created in 1992 and more than 1 trillion copies of those documents were made. Moreover, BIS estimated that printing and copying expenses average between 6% and 13% of a typical company's revenue. These statistics illustrate the economic savings available for those businesses that are able to merge paper and technology in a unified information processing strategy.

One tool that has proven useful for translating between paper and electronic information is the digital scanner. Scanner-enabled document distribution endows paper-based documents with the speed and convenience of electronic communications. A desktop scanner or network scanner allows business professionals to scan paper-based documents, manage them effectively and distribute them in a timely fashion. Users can share and distribute information easily by scanning directly to their email or PC fax applications. The growing popularity of fax modems and email is driving the acceptance of scanner-enabled document distribution in offices of all sizes. Fax/modem capabilities, which are available with virtually all modern PCs, enable users to send and receive faxes directly from a computer—at their desk or while traveling—and to check email remotely.

Nevertheless, while scanners are ideal for users who need to disseminate paper-based information to colleagues through PC facsimile and/or email, traditional flatbed scanners lack the convenience and flexibility that users have become accustomed to through such products as notebook computers and cellular phones. Hand-held scanners are an improvement in this regard; however, they are typically dependent on a host computer for displaying the scanned images and for providing power. U.S. Pat. No. 5,550,938 to Hayakawa et al. (hereinafter Hayakawa) discloses a portable image scanner designed to overcome these disadvantages. Specifically, Hayakawa discloses a hand-held cordless image scanner having a display/control screen, a memory for storing scanned images, a self contained power supply and an interface that allows the scanner to be received by a host computer as a memory card for transferring stored images from the scanner to the computer. While Hayakawa's scanner is effective in breaking the dependency on a host computer for image display and power, it still has several drawbacks. For example, Hayakawa's scanner offers no image processing features other than the capabilities of storing or discarding a newly scanned image and reviewing those images that have been stored previously. More advanced image processing would necessarily be done after transfer to a host computer. Moreover, Hayakawa does not offer a graphical user interface (GUI) containing icons and/or animations to assist users in operating their device. Finally, transfer of images is limited to those devices having ports for receiving an external memory card or the capability of reading the scanner memory through a memory card drive.

Accordingly, a heretofore unaddressed need exists in the industry for providing a hand-held image capturing appliance and method that allows users to navigate among multiple captured images, as well as functional menus in the appliance before transferring the captured images to some other unit such as a computer, printer, or facsimile machine. In addition, the capturing device should provide cordless operation and use a standard interface for transferring images to other devices. A GUI is preferred to assist users, particularly novices, in operating the device.

SUMMARY OF THE INVENTION

The present invention overcomes the inadequacies and deficiencies of the prior art as discussed hereinbefore. The present invention provides an image capturing appliance incorporating a menu/image navigation interface for communicating with and allowing the user to view multiple captured images as well as navigate menus on the appliance. The menu/captured image navigation interface and method facilitate ease of use and hardware simplification and miniaturization of the capturing appliance for seamless integration of the appliance into a consumer's existing tools and processes.

The capturing appliance contains a capturing means such as photocells and a storage means for storing captured images. A processing means is also provided for processing the acquired image and displaying it on a self-contained display of the appliance. Program instructions are provided in the memory of the appliance which allows the user to view and manipulate the captured image in a variety of pixel resolutions on the display of the appliance.

The menu/image navigation interface and method provides a user interface incorporating on-screen icons, directional navigation buttons for designating captured images to be viewed as well as selecting items from user interface menus, and other functional buttons to be used in conjunction with the navigation buttons to execute tasks on the capturing appliance. Also included are animated transitions to communicate to the user navigation among multiple captured images and menus on the display of the appliance.

The menu/image navigation interface and method of the present invention have many advantages, a few of which are delineated hereafter, as examples.

An advantage of the menu/image navigation interface and method of the present invention is that they provide a simple procedure for navigating among multiple captured images on an appliance using functional buttons which serve other purposes in other operational states of the appliance.

Another advantage of the menu/image navigation interface and method of the present invention is that they provide a more flexible and user friendly procedure for inspecting multiple captured images on an appliance.

Another advantage of the menu/image navigation interface and method of the present invention is that they provide a way of navigating menus in operating the appliance using functional buttons that serve other purposes in other operating states of the appliance.

Another advantage of the menu/image navigation interface and method of the present invention is that they provide a novel way of communicating functionality to the user through the use of animation.

Another advantage of the menu/image navigation interface and method of the present invention is that they provide for a procedure for navigating among images and menus in an appliance which is simple, easy to learn and efficient.

Another advantage of the menu/image navigation interface and method of the present invention is that they can be employed in virtually any graphical user interface (GUI).

Other features and advantages of the present invention will become apparent to one with skill in the art upon examination of the following drawings and detailed description. It is intended that all such additional features and advantages be included herein within the scope of the present invention, as is defined by the claims.

DETAILED DESCRIPTION OF THE PREFERRED EMBODIMENT

Reference is now made to the drawings wherein like reference numerals designate corresponding parts throughout these several figures. It should be understood by those skilled in the art that some aspects of the present invention may be practiced on any apparatus for the purposes of navigating menus and viewing multiple images, not limited to apparatuses which include or do not include image capturing capabilities through a photoelement array or scanning. For example, a user may use the menu/image navigation interface of the present invention for navigating menus and viewing multiple images or pages on different types of computers or appliances.

Architecture of the Image Capture and Communication Appliance

Figure 1A:
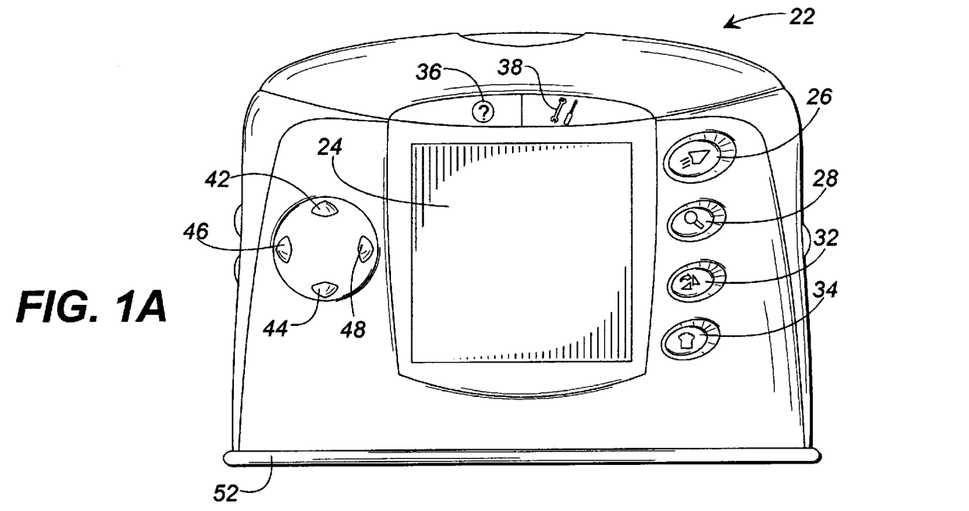
FIG. 1A is an elevation view of the hand-held image capture and communication appliance according to the present invention, which depicts a side of the unit containing the display screen, operation buttons, and navigation buttons.

A portable, hand-held, image capture and communication appliance 22 embodying the principles of the present invention is shown in FIGS. 1A through 1D. Specifically, FIG. 1A depicts one side (i.e., front) of appliance 22 where a flat-panel display 24 along with user operation buttons 26, 28, 32, 34, 36, 38 and user navigation buttons 42, 44, 46, 48 are located. Display 24 is preferably of the flat-panel variety to accommodate the hand size dimensions of appliance 22. Common types of flat-panel displays suitable for use in the present invention include electroluminescent displays, gas plasma discharge displays, liquid crystal displays (LCDs) and field emission displays (FEDs). Display 24 is the means by which information, including captured images, text, icons, and animations, is communicated to the user. The user operation buttons comprise an image send or transmit button 26, an image zoom button 28, an image rotate button 32, an image delete button 34, a help utility button 36 and a tools menu button 38. Send, zoom, rotate, and delete buttons 26, 28, 32 and 34 allow the user to electronically manipulate an image or page that has been scanned into memory through photoelement array 52. Activation of tools button 38 presents the user with a menu that includes possible image operations (e.g., image attachment/grouping, image detachment/ungrouping), changing the mode of appliance 22 (i.e., toggling between text (binary) capture and image (grayscale) capture), calibrating appliance 22, displaying a screen identifying important specifications such as a model number, hardware or software release number, memory usage, selecting a page size for printing, etc. or other user utilities not deserving of a dedicated external button for activation. Help button 36 provides the user with access to both general tutorials, process animation, and how-to instructions on the operation of appliance 22 and context sensitive instruction when requested while another operation or menu is active. The navigation buttons include an up button 42, a down button 44, a left button 46, and a right button 48 and are controlled by the user to steer a course through menu items and to view images or pages that have been captured in memory.

Figure 1B:
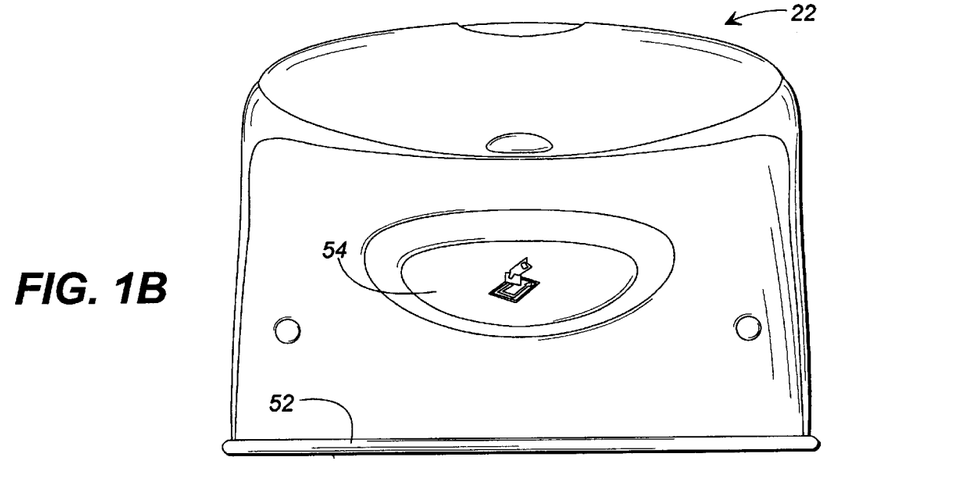
FIG. 1B is an elevation view of the appliance of FIG. 1A depicting the opposing side to that illustrated in FIG. 1A, which contains the capture button for performing an image capture.
Figure 1C:
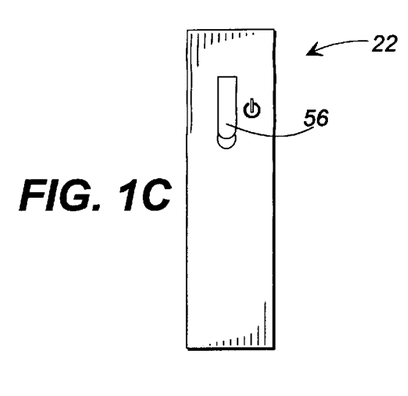
FIG. 1C is an elevation view of the appliance of FIGS. 1A and 1B depicting an end of the unit, which contains the power button.
Figure 1D:
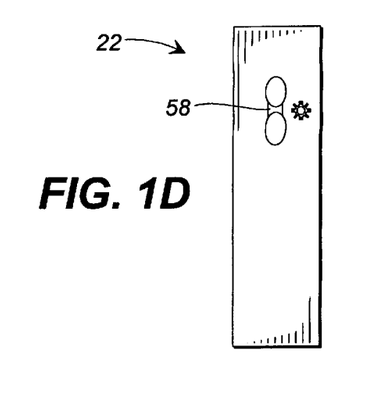
FIG. 1D is an elevation view of the appliance of FIGS. 1A, 1B, and 1C depicting the opposing end to that illustrated in FIG. 1C, which contains a brightness button for adjusting the visual clarity of the display screen.

FIG. 1B shows the side of appliance 22 opposite that illustrated in FIG. 1A (i.e., back). The back side of appliance 22 includes image capture button 54, which is depressed by a user to scan an image through photoelement array 52 and is released once the image is captured. A power button 56 is included at one end of appliance 22 as shown in FIG. 1C and a contrast control 58 for display 24 is located at the other end of appliance 22 as shown in FIG. 1D. The positioning of the various buttons, power switch 56 and contrast control 58 on appliance 22 as shown in FIGS. 1A through 1D is merely exemplary and can be modified as needed to satisfy the ergonomic requirements of the targeted user community.

Figure 2:
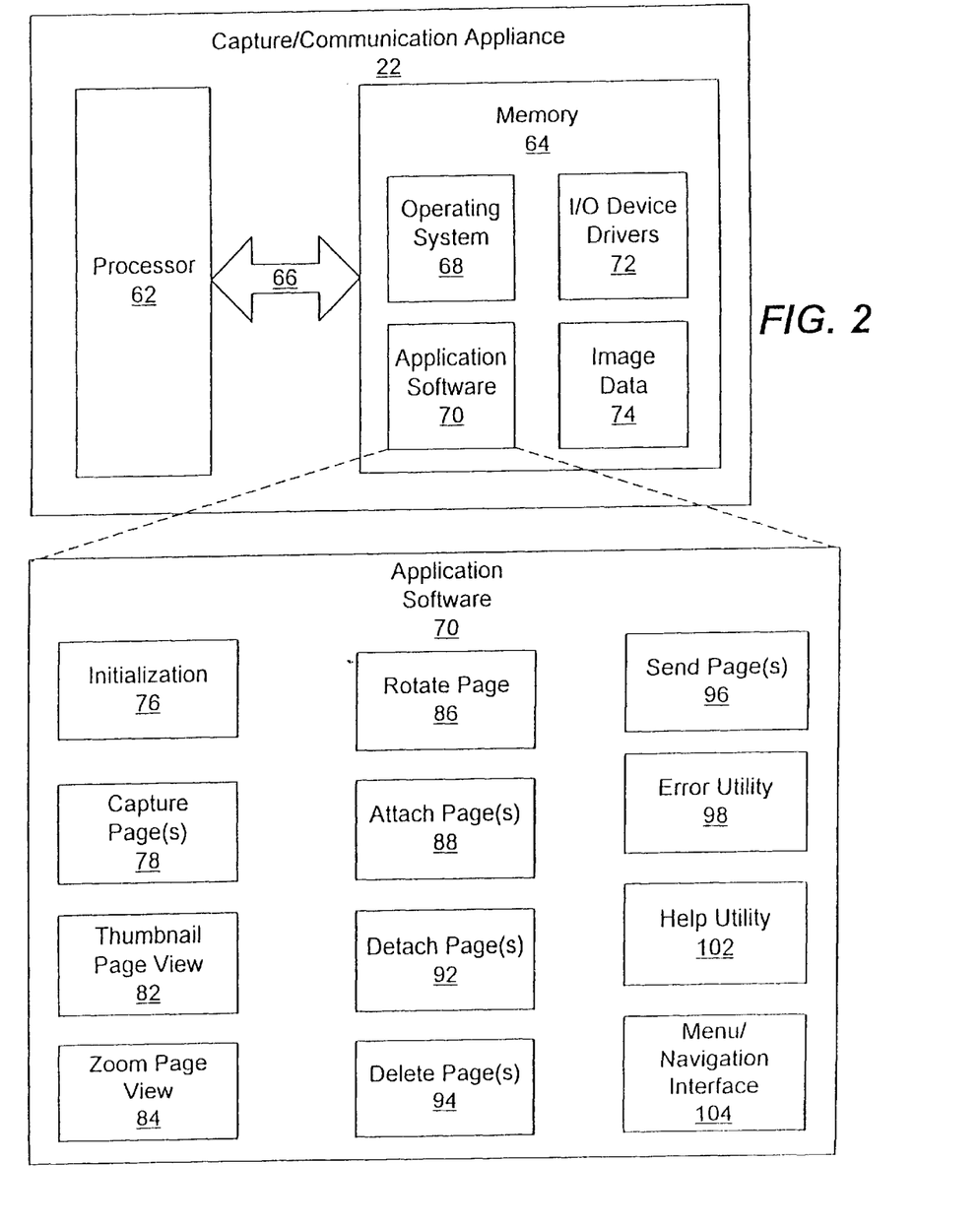
FIG. 2 is a high-level block diagram of the internal hardware and software architecture of the appliance illustrated in FIGS. 1A–1D.

Referring now to FIG. 2, the internal architecture of appliance 22 will be described hereafter. Appliance 22 includes a processor 62, which communicates with a memory 64 via address/data bus 66. Processor 62 can be any commercially available or custom microprocessor suitable for an embedded application. Memory 64 is representative of the overall hierarchy of memory devices containing the software and data used to implement the functionality of appliance 22. Memory 64 can include, but is not limited to, the following types of devices: cache, ROM, PROM, EPROM, EEPROM, flash, SRAM, and DRAM. As shown in FIG. 2, memory 64 holds four major categories of software and data used in appliance 22: the operating system 68; the application software 70; the I/O device drivers 72; and the image data 74 generated for each scan. Operating system 68 should be designed for real time embedded applications and, preferably, is relatively compact to make the most efficient use of memory 64. One such example of a real time operating system meeting these criteria is the PSOSYSTEM operating system (pSOSystem® or pSOS®) sold by Integrated Systems, Inc., Santa Clara, Calif., U.S.A., which is used in the preferred embodiment of the present invention. I/O device drivers 72 include software routines accessed through operating system 66 by application software 70 to communicate with devices such as display 24, certain memory components 64 and I/O ports such as a serial port or infra red (IR) port for transferring data to another appliance, device or system. The digital representations of the images captured by appliance 22 is denoted by image data 74. The format used for storing the images should be compatible with application software 70. One common format used for encoding images is the JPEG standard; however, other public or proprietary standards can be used with equal success. In the preferred embodiment, CCITT-G4, which is designed for facsimile usage and black and white images, is used. Finally, application software 70 comprises the control programs that implement the various features of appliance 22. Application software 70 and devices drivers 72 are typically written in a high-level programming language such as C or C++ for development convenience. Nevertheless, some drivers or application modules are sometimes written in assembly or machine language to optimize speed, memory usage or layout of the software in memory. In the preferred embodiment, the present invention uses C language to implement application software 70 and device drivers 72 and assembly language for the most time-critical sections.

Application software 70 can be broken into several modules corresponding to the various features of appliance 22, as shown in FIG. 2. These software modules include an initialization module 76, a capture page module 78, a thumbnail view module 82, a zoom view module 84, a page rotation module 86, an attach page module 88, a detach page module 92, a delete page module 94, a send page module 96, an error utility module 98, a help utility module 102 and a menu/navigation interface module 104. Note that an image captured in memory is interchangeably referred to herein as a "page" because the image is portrayed in appliance 22 as a physical page of text and/or imagery. A brief overview of each of the aforementioned modules follows hereafter.

Figure 8A:
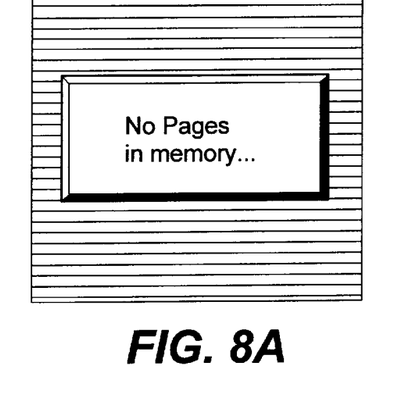
FIGS. 8A and 8B depict memory usage indicator icons on the display screen of FIG. 1A that provide a memory utilization report for the appliance.
Figure 8B:
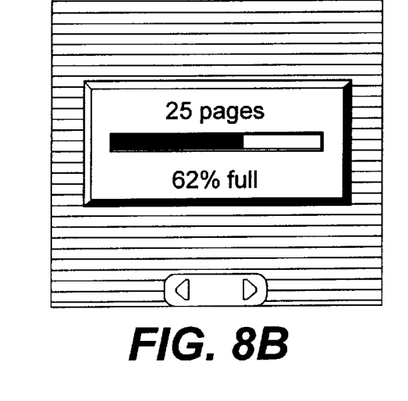
Figure 8C:
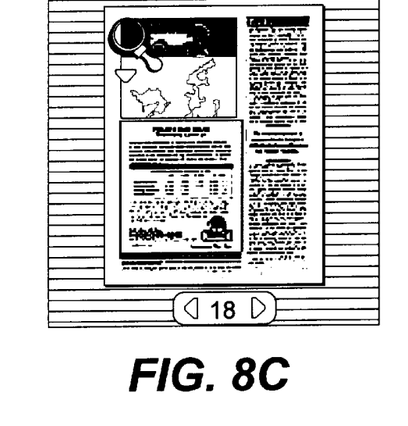
FIG. 8C illustrates a thumbnail view of a captured image on the display screen of FIG. 1A.
Figure 8D:
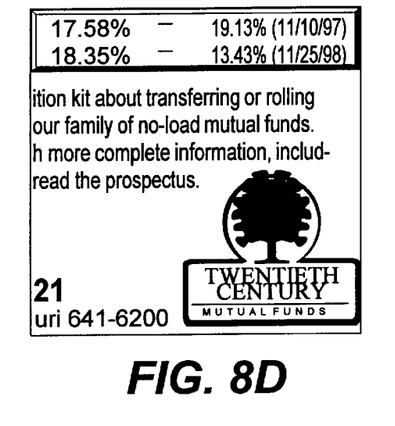
FIG. 8D illustrates a zoom view of a captured image on the display screen of FIG. 1A.

Initialization module 76 contains the boot software that is invoked when appliance 22 powers up. This module works closely with operating system 68 and device drivers 72 to perform any hardware initialization for processor 62, memory devices 64, display 24, and software initialization for global resources, such as message queues and buffers, system tasks, and memory partitions. Capture page module 78 controls the acquisition of images through photoelement array 52 and their conversion into a suitable format for storage in memory 64. Thumbnail view module 82 provides the default visual for pages and icons shown on display 24. The thumbnail view presents an entire page on display 24 as illustrated in FIG. 8C. Zoom view module 84 allows the user to magnify a portion of a page as illustrated in FIG. 8D. Page rotation module 86 allows the user to rotate a page either in thumbnail or zoom view in 90° increments. Attach page module 88 allows the user to logically join pages together to form a group of pages that can be deleted, sent or viewed as an individual unit, but not rotated or zoomed. Rotation and zoom always apply only to the current page. Conversely, detach page module 92 allows the user to separate a page or pages from a previously formed group. Delete page module 94 allows the user to purge a page or group of pages from memory 64. Send page module 96 allows the user to transfer a page or group of pages to another appliance, device or system through the serial or IR communication ports of appliance 22. Error utility module 98 provides notification to the user when the user attempts an invalid operation. Help utility module 102 provides the user, in real time, with general instructions and animations on operating appliance 22 and context sensitive instructions for performing a specific operation. Lastly, menu/navigation interface module 104 provides the user with graphical menus for performing various operations and processes the user's response thereto. Moreover, menu/navigation interface module 104 responds to navigation buttons 42, 44, 46, and 48 that allow the user to steer a course through the graphical menus and view the stored pages. The operation of menu/navigation interface module 104 will be discussed in detail hereinafter.

Figure 3:
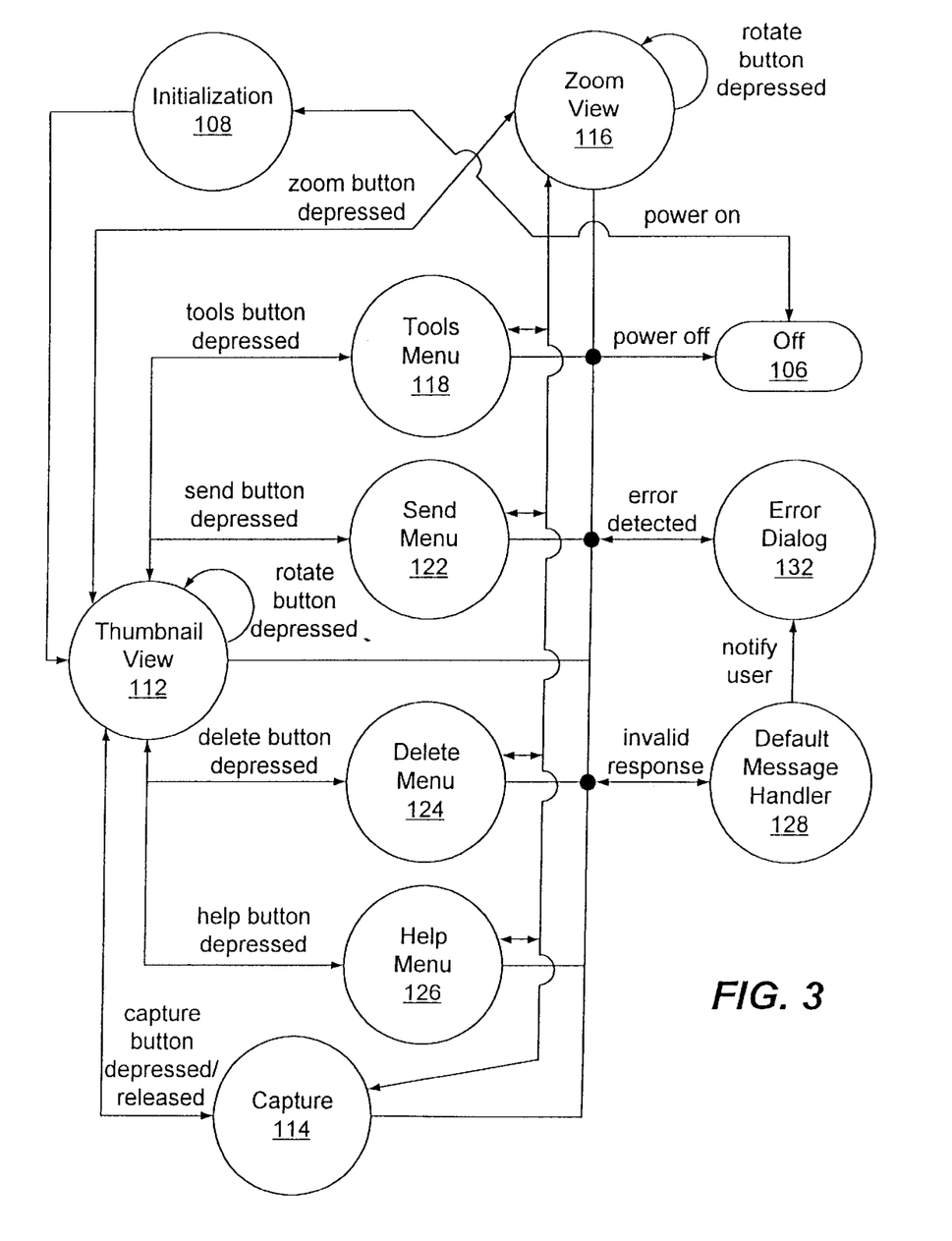
FIG. 3 is a high-level state diagram of the application software of FIG. 2.

A high level state diagram for application software 70 is shown in FIG. 3. This state diagram is useful for gaining a broad understanding of the operation of application software 70 and its associated software modules. These states are representative of tasks or processes in application software 70 that act on messages from a message queue, which are generated as a result of user interaction with appliance 22 (i.e., activation of buttons). Appliance 22 and application software 70 begin and terminate from the off state 106, which is controlled by the user through operation of power switch 56. Off state 106 can clearly be entered from any other state in response to a user turning appliance 22 off through switch 56. When a user turns switch 56 to the on position, the system will pass through a transient initialization state 108 during which time initialization module 76 is invoked to perform its functions. Once system initialization is complete, the system enters the thumbnail view state 112, which is the default state for viewing any captured images. From thumbnail view state 112, the system can transition to any one of several possible states depending on the action by the user. For example, the capture button can be pressed to enter capture state 114 to perform an image capture. After the image is captured, the button is released to return to thumbnail view state 112. If the user wishes to change the orientation of the captured image, then activation of rotation button 32 will rotate the captured image 90° with each invocation. Moreover, now that an image is captured in memory 64, a user can obtain a magnified view of a portion of the image or page by pressing zoom button 28 to enter zoom view state 116. Similar to thumbnail view state 112, the magnified image can also be rotated through application of rotation button 32. The system will return to thumbnail view state 112 through operation of zoom button 28 or performing certain actions such as capture, send, delete, attach, detach, etc. Additionally, the thumbnail view state 112 includes functionality for the empty (no images) state and the image verification state.

Figure 4A:
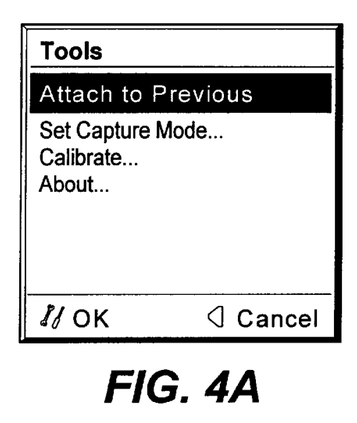
FIGS. 4A and 4B illustrate the tools menus displayed on the display screen of FIG. 1A.
Figure 4B:
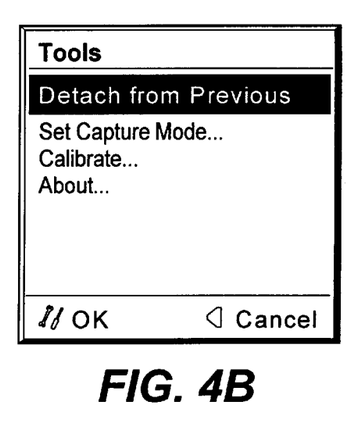
Figure 5:
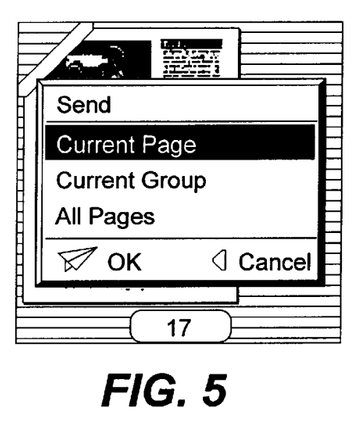
FIG. 5 illustrates the send menu displayed on the display screen of FIG. 1A.
Figure 6:
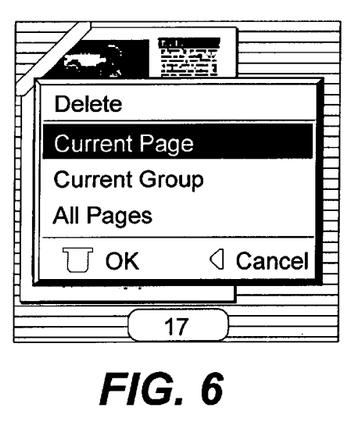
FIG. 6 illustrates the delete menu displayed on the display screen of FIG. 1A.
Figure 7:
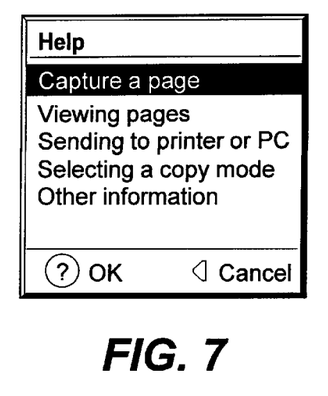
FIG. 7 illustrates the help menu displayed on the display screen of FIG. 1A.

From thumbnail view state 112, one of four menu states can be entered depending on the choice made by the user. First, activation of tools button 38 will transition the system into tools menu state 118 where a menu of possible page operations and/or features is exhibited on display 24 as illustrated in FIGS. 4A and 4B. Second, activation of send button 26 will transition the system into send menu state 122 where a menu of options for transferring a page or group of pages to another appliance, device or system is exhibited on display 24 as illustrated in FIG. 5. Third, activation of delete button 34 will transition the system into delete menu state 124 where a menu of options for deleting a page or group of pages from memory 64 is exhibited on display 24 as illustrated in FIG. 6. Lastly, activation of help button 36 will transition the system into help menu state 126 where a menu of help topics is exhibited on display 24 as illustrated in FIG. 7. Once any of the aforementioned menu states is reached, the user can choose a desired menu option by using navigation buttons 42 and 44 and then validating the choice by pressing a confirmation button. In the preferred embodiment of the present invention, the confirmation button is simply the button by which the present menu on display is accessed. An icon indicating the appropriate confirmation button is displayed in the lower left hand side of the menus as illustrated in FIGS. 4A through 7. Menu states may be exited by simply invoking navigation button 46 to transition to a previous state.

Figure 9:
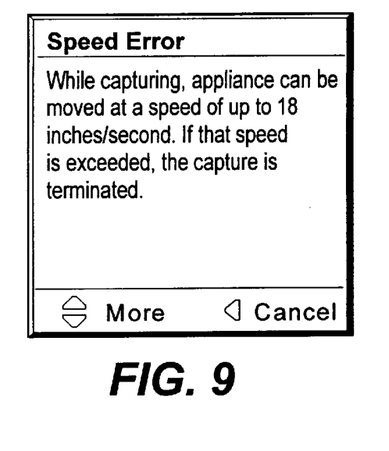
FIG. 9 illustrates the speed error message together with navigational arrow descriptors as displayed on the display screen of FIG. 1A.

From some states, an invalid response by the user (i.e., user presses an inactive button) will be ignored or will result in a transition to the default message handler state 128 where the user response is interpreted through the message that was generated internally and a transition is made to the error dialog state 132 to notify the user of their error via a message or graphic on display 24. Inactive buttons will occasionally also display a blinking icon to communicate to the user the selection of the inactive button and which buttons are active. Alternatively, error dialog state 132 can be entered directly if application software 70 detects an error in the execution of a valid operation. The most common example of this is when the user follows an improper capture path with appliance 22 during the image capture process. An example of such an error is displayed in FIG. 9.

The features provided by the menu/navigation interface software module 104 will be described hereafter with frequent reference to (a) the architecture and operation of the application software 70 of FIG. 2; (b) the flowcharts of FIG. 15A, FIG. 15B and FIG. 15C; and (c) the captured page illustrations of FIGS. 4A through FIG. 14C.

Operation of the Menu/Navigation Interface and Method

Figure 10:
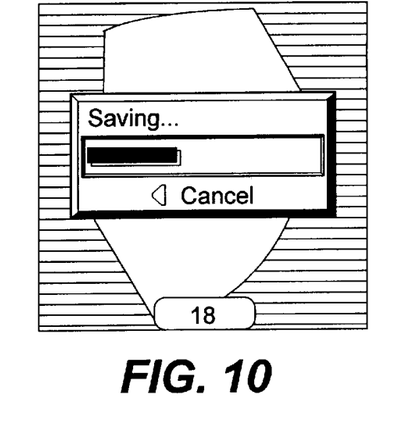
FIG. 10 illustrates a progress box giving the status of image processing together with a navigational arrow descriptor, as displayed on the display screen of FIG. 1A.

Recall from the state diagram of FIG. 3 that when power is provided via switch 56 (FIG. 1C) application software 70 passes through a transient initialization state 108 to reach thumbnail view state 112, which is the default state for capturing images using capture button 54 and viewing images. During the thumbnail view state 112 and before any images have been captured, the navigation buttons 42, 44, 46, 48 do not have any functionality other than to invoke a momentary message box indicating which button to press, the capture button 54, to begin an image capture. Once the user begins an image capture, the menu/navigation interface and method make it possible for the user to cancel the acquisition of an image by pressing the left navigation button 46 (FIG. 1A) during the capturing process, denoted by a "Saving . . . " dialog on the display 24 (FIG. 1A) of the appliance 22 (FIGS. 1A–1D). The availability of this functionality is communicated to the user by a notation appearing within the dialog labeling the left navigation button 46 (FIG. 1A) as "Cancel" as illustrated in FIG. 10. The use of the left navigation button 46 (FIG. 1A) for this functionality eliminates the need of an additional input device such as a mouse pointer as is typically found in conventional windowed systems to point and click on a "Cancel" or "Quit" button.

Upon successfully capturing an image, the image is displayed as a thumbnail size icon (FIG. 8C) on the display 24 (FIG. 1A). From this state, the appliance may reach various other states, i.e. TOOLS MENU 118, SEND MENU 122, DELETE MENU 124, HELP MENU 126 where users interact with a menu at step or message box to operate the appliance in that state. Additionally, the ZOOM VIEW state enables the user to position a metaphoric icon over an area of the thumbnail image to be magnified. ERROR DIALOG messages can be entered from any state. In all of the aforementioned states, the navigation buttons serve functions in conjunction with other operational buttons to enable the user to operate the appliance.

Figure 15A:
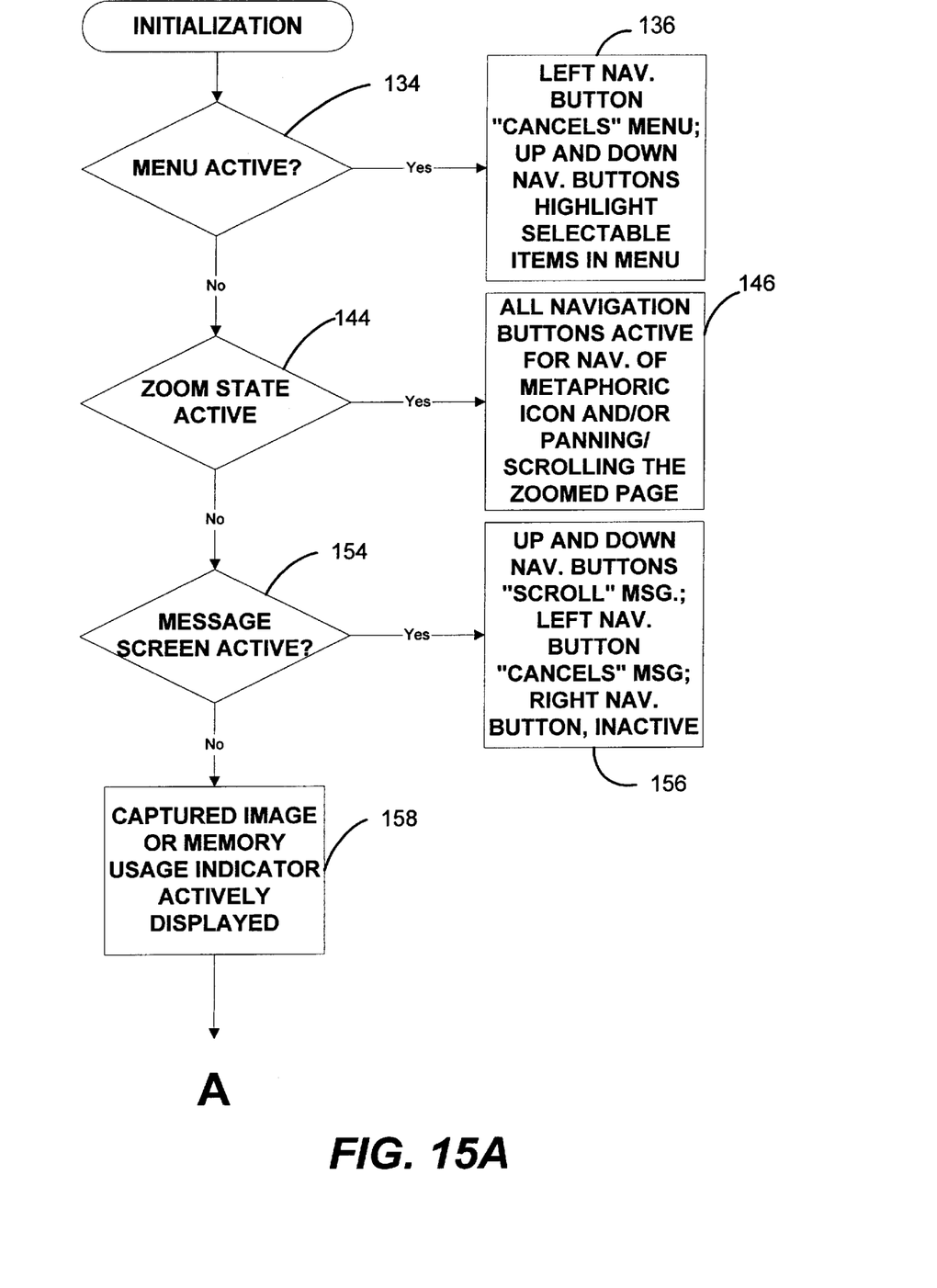
FIGS. 15A, 15B and 15C are flowcharts describing the architecture and operation of the menu/navigation interface software module of FIG. 2.
Figure 15B:
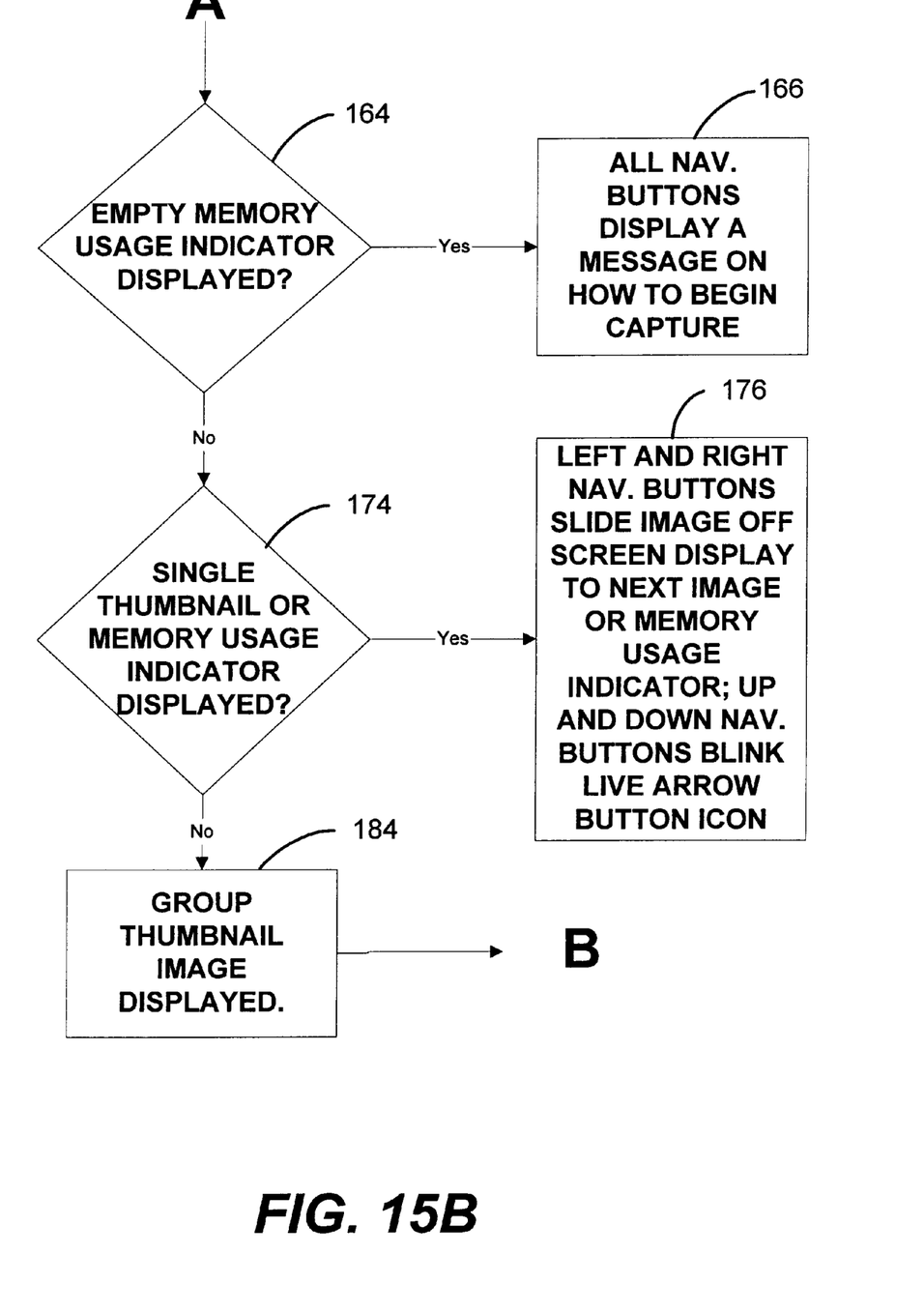
Figure 15C:
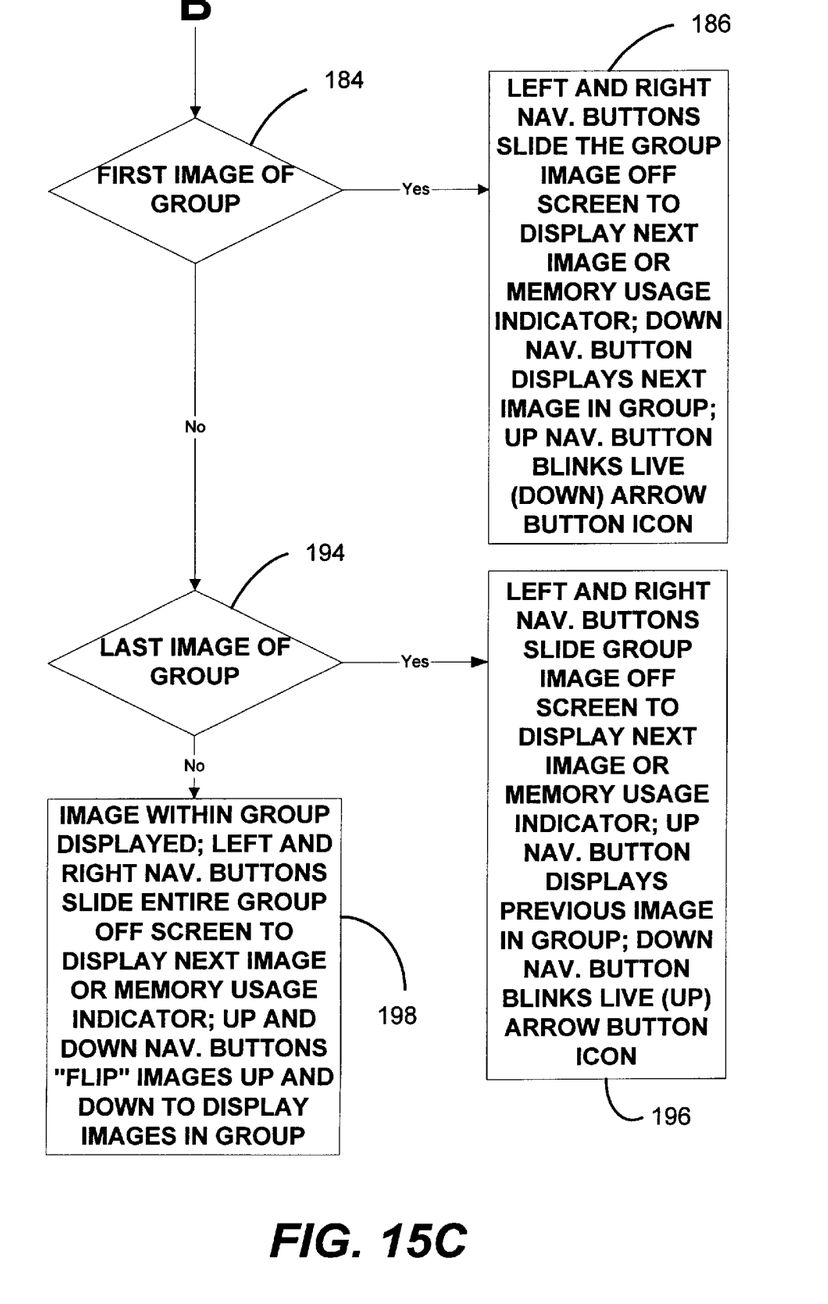

FIG. 15A, FIG. 15B and FIG. 15C are functional flowcharts detailing the operation of the navigation buttons of the menu/navigation interface and method during different states of the appliance.

Figure 8E:
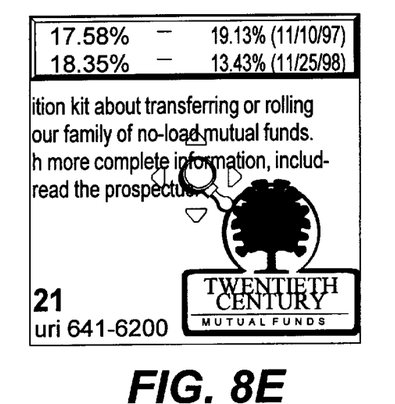
FIG. 8E illustrates the zoom view of a captured image of FIG. 8D on the display screen of FIG. 1A, together with a metaphorical icon surrounded by directional arrows.
Figure 8F:
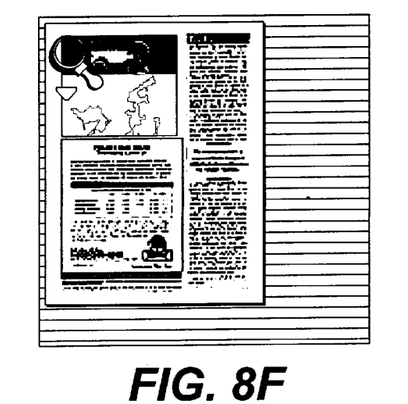
FIG. 8F illustrates the thumbnail view of FIG. 8C on the display screen of FIG. 1A, together with a metaphorical icon with directional arrows.
Figure 11:
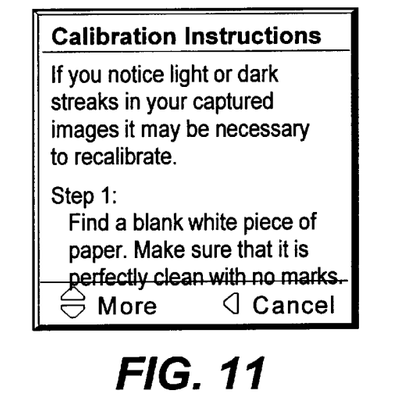
FIG. 11 illustrates the calibration instructions as displayed on the display screen of FIG. 1A.
Figure 12:
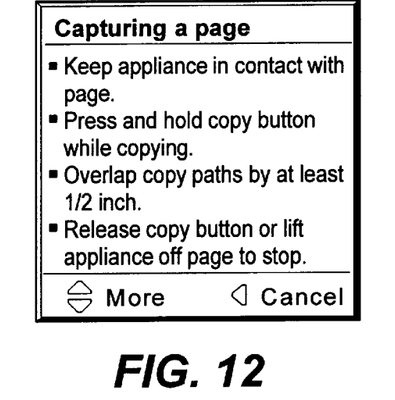
FIG. 12 illustrates a capturing a page help screen together with navigational arrow descriptors as displayed on the display screen of FIG. 1A.

In FIG. 15A, as aforementioned, the appliance is initialized at power up. Program code within the menu/navigation interface module then checks if a menu is active 134. If so, the left navigation button is programmed to "Cancel" the active menu. Additionally, the up navigation button and the down navigation button is programmed to scroll a highlight bar through the selectable items within the menu 136 as illustrated in FIG. 4A through FIG. 7. If the program code finds that a menu is not active, it then checks if the zoom state is active 144. If the zoom state is active, all navigation buttons are programmed to operate in conjunction with the zoom button 28 (FIG. 1A) to directionally move a metaphoric icon across the image to select an area to magnify to a greater pixel resolution 146 as illustrated in FIG. 8E and FIG. 8F and/or to pan/scroll the zoomed page. If the zoom state is not active, program code checks if a message screen is active 154. If so, the up navigation button and the down navigation button are programmed to "scroll" a message which is too large to fit in the message dialog box. This instance may involve an error message, a help message or a status message as displayed in FIG. 9, FIG. 11 and FIG. 12. Scrollable functionality is communicated to the user by up and down navigation arrows along with "More" being displayed in the header or footer of the dialog box. Additionally, the left navigation button cancels the message box 156. If a menu, zoom state, or message screen at step is not active, the program determines that a captured image or memory usage indicator is actively displayed 158.

Figure 13:
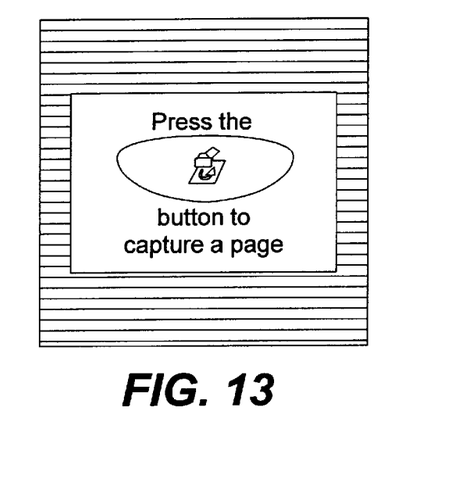
FIG. 13 illustrates a momentary help screen instructing the user to initiate a capture as displayed on the display screen of FIG. 1A.

Next, in FIG. 15B, it is determined if an empty memory usage indicator (FIG. 8A) is displayed at step 164. If so, in the preferred embodiment, all navigation buttons are programmed to display a message on how to begin an image capture 166 as displayed in FIG. 13. If an empty memory usage indicator (FIG. 8A) is not being displayed at step, it is determined if a single image or a (non-empty) memory usage indicator (FIG. 8B) is displayed 174. If so, in the preferred embodiment, the left and right navigation buttons 46 and 46 (FIG. 1A) are programmed to slide the displayed image or memory usage indicator (FIG. 8B) to the right or left direction and off the screen and slide a next or previous captured image or memory usage indicator (FIG. 8B) in memory onto the display 176. It should be understood by those skilled in the art that the up and down arrows could have optionally been used to slide the image up or down off of the display. However, in the preferred embodiment, depressing the up or down navigation buttons will blink live arrow button icons on the screen 176. If a single image or memory usage indicator (FIG. 8B) is not displayed and an empty memory usage indicator is not displayed at step 164, the program code determines that a group image is being displayed 184.

Figure 14A:
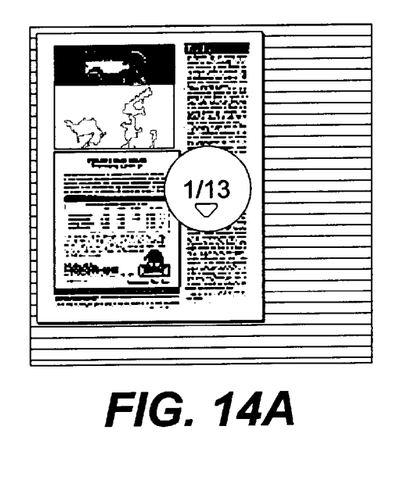
FIG. 14A illustrates the first image of an attached group of captured images together with navigational arrow descriptors as displayed on the display screen of FIG. 1A.
Figure 14B:
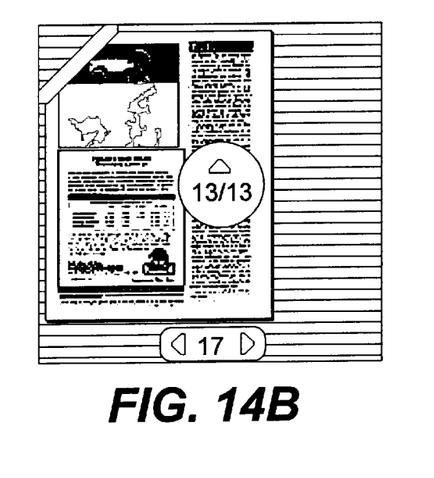
FIG. 14B illustrates the last image of an attached group of captured images together with navigational arrow descriptors as displayed on the display screen of FIG. 1A.
Figure 14C:
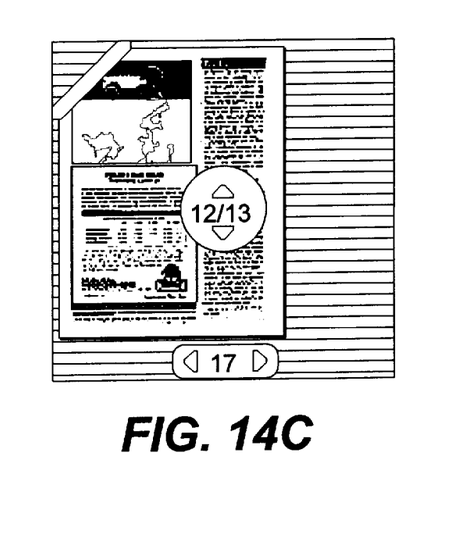
FIG. 14C illustrates an image within an attached group of captured images together with navigational arrow descriptors as displayed on the display screen of FIG. 1A.

Referring to FIG. 15C, if it is determined that a group at step image is displayed, it is determined if the first image of the group FIG. 14A is being displayed 184. If so, then the left navigation button is programmed to slide the entire group of thumbnail images to the right and off the display to display the previous thumbnail image or memory usage indicator at the previous memory location before the group of thumbnail images 186. Similarly, the right navigation button is programmed to slide the entire group of thumbnail images to the left to display the next thumbnail image or group of thumbnail images at step or memory usage indicator stored at the next memory location after the group of thumbnails 186. The down navigation button is programmed to display the next thumbnail image in the group 186. The up navigation button is programmed to momentarily blink a live down arrow button icon to help users discover live buttons 186 as shown in FIG. 14A. If the first image of the group is not displayed, it is then determined if the last image of the group FIG. 14B is displayed 194. If so, the up navigation button is programmed to display the previous thumbnail image stored in the thumbnail group 196. The down navigation button will momentarily blink a live up arrow button icon to help users discover live buttons 196 as shown in FIG. 14B. If neither the first image nor the last image of a group is displayed, but a group image is displayed, it is determined that an image within a group FIG. 14C is being displayed 198. In this instance, all navigation buttons are functional with the up and down navigation buttons being programmed to navigate within the group of images and the left and right navigation buttons closing the group and displaying either the previous image stored in memory before the grouped images or the next image stored in memory after the grouped images 198 or memory usage indicator.

The menu navigation interface program 104 of the present invention can be implemented in hardware, software, firmware, or a combination thereof. In the preferred embodiment(s), the menu navigation interface program 104 is implemented in software or firmware that is stored in a memory 64 and that is executed by a suitable instruction execution system.

The menu navigation interface program 104, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory 64.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

What is claimed is:

1. A hand-held image capturing and communication appliance, comprising:
    a photoelement array of said hand-held image capturing and communication appliance for acquiring image data;
    a menu interface for controlling said hand-held image capturing and communication appliance;
    a memory of said hand-held image capturing and communication appliance for saving said image data;
    a processor of said hand-held image capturing and communication appliance in communication with said memory;
    a control instrument of said hand-held image capturing and communication appliance in communication with said processor;
    a display of said hand-held image capturing and communication appliance in communication with said processor for displaying said image data; and
    program code stored in said memory and executed by said processor using said control instrument for navigating among a plurality of said image data, said program code further comprising a menu navigation software module for navigating a plurality of menus of said menu interface using said control instrument.

2. The appliance of claim 1, wherein when at least one of said plurality of menus of said menu interface is activated and displayed on said display, said control instrument controls selection of at least one of said elements of said menu.

3. The appliance of claim 1, wherein when none of said plurality of menus is active and said image data is stored in said memory, said control instrument controls navigation among said images stored in said memory.

4. The appliance of claim 1, wherein said control instrument is a set of navigational buttons.

5. The appliance of claim 4, wherein said set of navigational buttons comprise:
    a left navigation button;
    a right navigation button;
    an up navigation button; and
    a down navigation button.

6. The appliance of claim 5, wherein said left navigation button deactivates at least one of said plurality of menus which is displayed on said display when said menu interface is active.

7. The appliance of claim 5, wherein said up navigation button distinguishes each said element of said menu sequentially up a list of said menu elements when said menu interface is active.

8. The appliance of claim 5, wherein said down navigation button distinguishes each of said elements of said menu sequentially down a list of said menu elements when said menu interface is active.

9. The appliance of claim 5, wherein said up navigation button navigates among attached images grouped into a logical unit when said menu interface is not active and an image is displayed which is grouped into said logical unit.

10. The appliance of claim 9, wherein said up navigation button displays the previous image grouped into said logical unit.

11. The appliance of claim 5, wherein said down navigation button navigates among attached images grouped into a logical unit when said menu interface is not active and an image is displayed which is grouped into said logical unit.

12. The appliance of claim 11, wherein said down navigation button displays the next image grouped into said logical unit.

13. The appliance of claim 5, wherein said left navigation button navigates among said image data stored in said memory which is not in the current logically grouped unit.

14. The method of claim 13, wherein said left navigation button displays the previous logically grouped unit of said image data stored in the previous contiguous memory location in said memory.

15. The appliance of claim 5, wherein said right navigation button navigates among said image data stored in said memory which is not in the current logically grouped unit.

16. The appliance of claim 15, wherein said right navigation button displays the next logically grouped unit of said image data stored in the next contiguous memory location in said memory.

17. A method for navigating among a plurality of image data using a hand-held image capturing and communication appliance, said method comprising the steps of:
    acquiring image data for said hand-held image capturing and communication appliance;
    saving said image data in a memory of said hand-held image capturing and communication appliance;
    displaying said image data on a display of said hand-held image capturing and communication appliance;
    providing a menu interface for controlling said hand-held image capturing and communication appliance by navigating a plurality of menus of said menu interface, said menu interface using program code stored in said memory and executed by a processor; and
    navigating among a plurality of said image data using said menu interface.

18. The method of claim 17, further comprising the step of:
    selecting at least one element of said menu when at least one of said plurality of menus of said menu interface is activated and displayed.

19. The method of claim 17, further comprising the step of:
    navigating among said images stored in said memory when none of said plurality of menus is active and said image data is stored in said memory.

20. The method of claim 17, further comprising the step of:
    providing a plurality of navigation buttons, said plurality of navigation buttons including a left navigation button, a right navigation button, an up navigation button and a down navigation button.

* * * * *